(12) United States Patent
Chen et al.

(10) Patent No.: US 10,551,646 B2
(45) Date of Patent: Feb. 4, 2020

(54) ARRAY SUBSTRATE AND MAGNETO-OPTICAL SWITCH DISPLAY

(71) Applicants: BOE TECHNOLOGY GROUP CO., LTD., Beijing (CN); BEIJING BOE DISPLAY TECHNOLOGY CO., LTD., Beijing (CN)

(72) Inventors: Pengming Chen, Beijing (CN); Bin Zhang, Beijing (CN); Dianzheng Dong, Beijing (CN); Kan Zhang, Beijing (CN); Qiang Zhang, Beijing (CN); Guangxing Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 15/513,846

(22) PCT Filed: Oct. 12, 2016

(86) PCT No.: PCT/CN2016/101930
§ 371 (c)(1),
(2) Date: Mar. 23, 2017

(87) PCT Pub. No.: WO2017/118134
PCT Pub. Date: Jul. 13, 2017

(65) Prior Publication Data
US 2018/0045986 A1 Feb. 15, 2018

(30) Foreign Application Priority Data
Jan. 4, 2016 (CN) .......................... 2016 1 0003747

(51) Int. Cl.
*G02F 1/09* (2006.01)
*G02F 1/00* (2006.01)

(52) U.S. Cl.
CPC ............ *G02F 1/092* (2013.01); *G02F 1/0036* (2013.01); *G02F 2203/055* (2013.01); *G02F 2203/07* (2013.01)

(58) Field of Classification Search
CPC ......... G02F 2001/133616; G02F 1/313; G02F 1/09; G02F 1/133606; G02F 1/1368;
(Continued)

(56) References Cited

U.S. PATENT DOCUMENTS

2002/0135729 A1   9/2002   Tokita et al.
2002/0150340 A1*  10/2002  Ikeda ........................ G02F 1/09
                                                                    385/39
(Continued)

FOREIGN PATENT DOCUMENTS

CN      1961233 A      5/2007
CN    102662249 A      9/2012
(Continued)

OTHER PUBLICATIONS

The First Chinese Office Action dated Sep. 29, 2017; Appln. 201610003747.1.
(Continued)

*Primary Examiner* — Brandi N Thomas
(74) *Attorney, Agent, or Firm* — Ladas & Parry LLP

(57) ABSTRACT

An array substrate and a magneto-optical switch display. The array substrate includes: a thin film transistor T, a coil connected with the thin film transistor, and a magneto-optic crystal interposed in the coil, the coil and the magneto-optic crystal constituting a magneto-optical switch structure, and the magneto-optical switch structure can change a transmission rate of emergent light transmitting through the array substrate.

16 Claims, 3 Drawing Sheets

(58) Field of Classification Search
CPC .... G02F 2202/32; G02F 1/0036; G02F 1/092;
G02F 1/133615; G02F 1/13362; G02F
1/29; G02F 1/31; G02F 2001/311; G02F
2203/055; G02F 2203/07; G02F 2203/34;
G02B 6/0028; G02B 6/0076; G02B
6/0018; G02B 6/0068; G02B 6/006;
G02B 6/002; G02B 27/0101; G02B
6/0088; G02B 6/0036; G02B 6/0065;
G02B 6/003; G02B 6/005; G02B 6/0058;
G02B 6/0053; G02B 6/0078; G02B
6/0043; G02B 27/017; G02B 6/0085
USPC ....... 359/237, 242, 265–267, 272, 273, 281,
359/290–292, 298
See application file for complete search history.

(56) References Cited

U.S. PATENT DOCUMENTS

| | | | |
|---|---|---|---|
| 2005/0180084 A1* | 8/2005 | Rober | H01H 47/325 361/154 |
| 2005/0201655 A1 | 9/2005 | Ellwood, Jr. | |
| 2011/0149018 A1* | 6/2011 | Kroll | G03H 1/02 348/40 |
| 2014/0078199 A1 | 3/2014 | Zuo et al. | |
| 2015/0146279 A1 | 5/2015 | Liang et al. | |
| 2015/0182133 A1* | 7/2015 | Sano | F16K 1/36 600/498 |

FOREIGN PATENT DOCUMENTS

| | | |
|---|---|---|
| CN | 103163651 A | 6/2013 |
| CN | 203101763 U | 7/2013 |
| CN | 103235460 A | 8/2013 |
| CN | 103487954 A | 1/2014 |
| CN | 105425428 A | 3/2016 |
| GB | 1187594 A | 4/1970 |
| WO | 2005/076715 A2 | 8/2005 |

OTHER PUBLICATIONS

International Search Report and Written Opinion dated Dec. 26, 2016; PCT/CN2016/101930.

* cited by examiner

ARRAY SUBSTRATE AND MAGNETO-OPTICAL SWITCH DISPLAY

TECHNICAL FIELD

Embodiments of the present disclosure relate to an array substrate and a magneto-optical switch display.

BACKGROUND

A Cathode Ray Tube (CRT) display has developed for decades, its technical structure principle limits its further development, and several major inherent shortcomings of a vacuum cathode ray tube renders it more and more difficult for the CRT display to satisfy the higher requirements of consumers to the display. At this time, a flat panel display emerges as a new force, and a liquid crystal display, by virtue of its advantages, such as low power consumption, less heat dissipation, thinness and lightness, and precise image reduction, rapidly occupies the display market. The liquid crystal display also has natural defects, one of the most important defects is long response time, and the response time is a special indicator of the liquid crystal display. The response time of the liquid crystal display refers to a response speed of respective pixel points of the display to an input signal. If the response time is short, a phenomenon of image trailing will not be generated when a motion picture is displayed. It is important when playing games and watching fast motion images. The response time, which is short enough, can ensure continuity of a picture.

For the current liquid crystal display on the market, the response time has already been a great breakthrough, but it cannot meet display requirements on running 3D games and playing high-quality DVD movies.

SUMMARY

Embodiments of the present disclosure provide an array substrate and a magneto-optical switch display.

According to at least one embodiment of the present disclosure, an array substrate is provided, including: a thin film transistor; and a magneto-optical switch structure, the magneto-optical switch structure including a coil connected with the thin film transistor, and a magneto-optic crystal interposed in the coil, the magneto-optical switch structure being configured to change a transmission rate of emergent light which passes through the array substrate.

For example, a magneto-optical material of the magneto-optic crystal includes a Garnet saturated magnetic field (GSF) thin film.

For example, the coil includes a solenoid formed by winding a lead.

For example, the lead includes a metal lead.

For example, the metal lead includes an enamelled copper wire, or an insulated copper wire.

For example, the enamelled copper wire has a diameter in a range of 0.01 mm to 0.02 mm.

For example, the solenoid has a length in a range of 4 mm to 8 mm, the solenoid has a diameter in a range of 0.183 mm to 0.23 mm, and the number of turns of the coil is 200 to 300.

According to an embodiment of the present disclosure, a magneto-optical switch display is provided, including the array substrate; a current pulse controller connected with the thin film transistor in the array substrate, and configured to input pulse current for the magneto-optical switch structure in the array substrate; a first polarizer provided on a light incident side of the array substrate, and configured to polarize the incident light incident on the array substrate; and a second polarizer provided on a light emergent side of the array substrate, and configured to polarize the emergent light transmitted from the array substrate.

For example, when the coil does not generate a magnetic field, the emergent light is entirely transmitted through the second polarizer, and pixels of the array substrate display a highest gray scale.

For example, when a magnetic field intensity value of the magnetic field generated by the coil is smaller than a preset magnetic field intensity threshold, the emergent light is partially transmitted through the second polarizer, and the pixels of the array substrate display a gray scale between the highest gray scale and a lowest gray scale.

For example, when a magnetic field intensity value of the magnetic field generated by the coil reaches but does not exceed a preset magnetic field intensity threshold, the emergent light cannot transmit through the second polarizer, and the pixels of the array substrate display a lowest gray scale.

For example, the magneto-optical switch display further including a backlight provided at the light incident side of the first polarizer, and configured to generate the incident light; and a color filter provided on the light emergent side of the second polarizer.

BRIEF DESCRIPTION OF THE DRAWINGS

Embodiments of the present disclosure will be illustrated in more details in connection with the drawings so as to enable one of ordinary skill in the art to more clearly understand the embodiments of the present disclosure, in which.

DETAILED DESCRIPTION

Technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, a person of ordinary skill in the art can obtain other embodiment(s), without any creative work, which shall be within the scope of the present disclosure.

Unless otherwise defined, all the technical and scientific terms used herein have the same meanings as commonly understood by a person of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "front," "back," or the like are only used to indicate relative position relationship, and when the position of the object which is described is changed, the relative position relationship may be changed accordingly.

To solve a problem of a slow response speed of a pixel of an LCD display, based on a magneto-optical switch principle of a magneto-optical Faraday effect, by changing a polarization plane when the polarized light propagates in a magneto-optical medium by a magnetic field, selecting on and off states of an optical path through combining a polarizer so as to implement turning on and off a thin film transistor, embodiments of the present disclosure can control a rotation angle of polarized light by intensity of the magnetic field, so as to control intensity of emergent light, such that the emergent light passes through a color filter and then generates a gray scale and a color as desired.

To help understanding, the magneto-optical switch principle is briefly introduced firstly.

Figure 1:
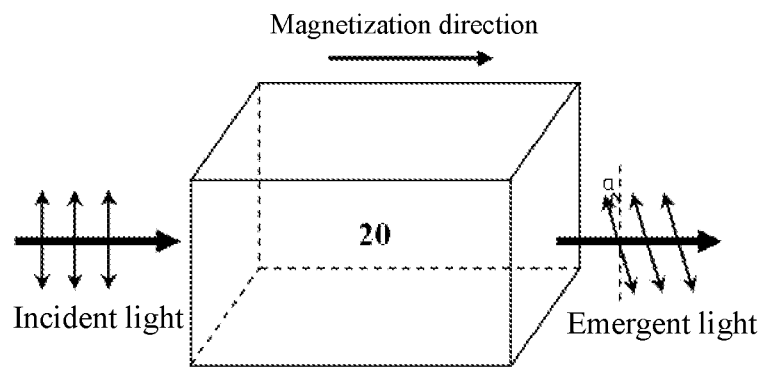
FIG. 1 is a schematic diagram of a magneto-optical Faraday effect.

The magneto-optical switch principle is based on the magneto-optical Faraday effect, in which the polarization plane is changed when a polarized light propagates in the magneto-optical medium by the magnetic field, the "on" and "off" states of the optical path is selected by using an analyzer (for example, the polarizer), so as to implement "on" and "off" states of a device. In 1845, for the first time, M•Faraday discovered the magneto-optical Faraday effect in a flint glass containing lead oxide (PbO) in a strong magnetic field. The magneto-optical Faraday effect refers to that when a beam of linearly polarized light propagates in a certain medium, if there is a magnetic field parallel to the propagation direction of the light in the medium, the polarization plane of the light will be rotated, a rotation angle ψ (unit: degree (°)) and magnetic induction B (unit: T) are associated with a propagation distance I (unit: cm) of the light in the medium, with a relational equation of ψ=VBI, where the medium having the magneto-optical effect is referred to as a magneto-optical material, V is a Verdet constant of the magneto-optical material, which is an inherent proportionality coefficient of a substance (unit: °/(Oe·cm). To help understanding, please refer to FIG. 1 (FIG. 1 is a schematic diagram of a Faraday rotation effect).

Figure 3:
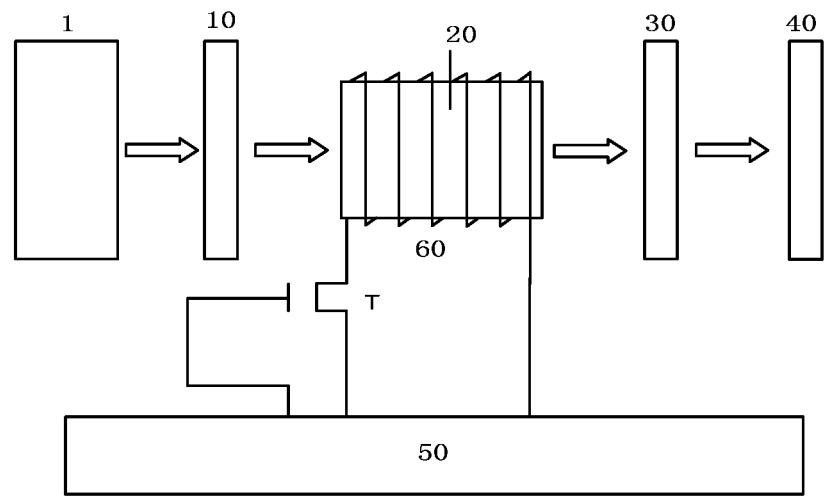
FIG. 3 is a structural schematic diagram of a display with a magneto-optical switch display structure according to an embodiment of the present disclosure.
Figure 5:
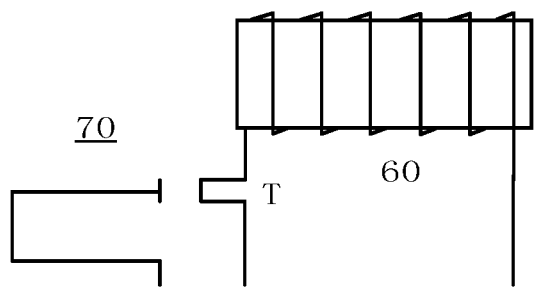
FIG. 5 is a structural schematic diagram of a magneto-optical switch structure according to an embodiment of the present disclosure.

An embodiment of the present disclosure provides an array substrate; as shown in FIG. 3 and FIG. 5, the array substrate includes: a thin film transistor; a coil 60 connected with the thin film transistor, and a magneto-optical switch structure 70. The magneto-optical switch structure 70 includes a coil 60 and a magneto-optic crystal 20 interposed in the coil 60. The magneto-optical switch structure 70 can change a transmission rate of an emergent light which passes through the array substrate.

By integrating the magneto-optical switch structure and connecting with the thin film transistor in the array substrate, i.e., by replacing a liquid crystal optical switch of an LCD display with the magneto-optical switch structure, the embodiment of the present disclosure can render angular deflection of the polarization plane of the incident light which passes through the magneto-optic crystal of the magneto-optical switch structure, so as to control the intensity of the emergent light, which can effectively improve the response speed of display pixels.

Figure 2:
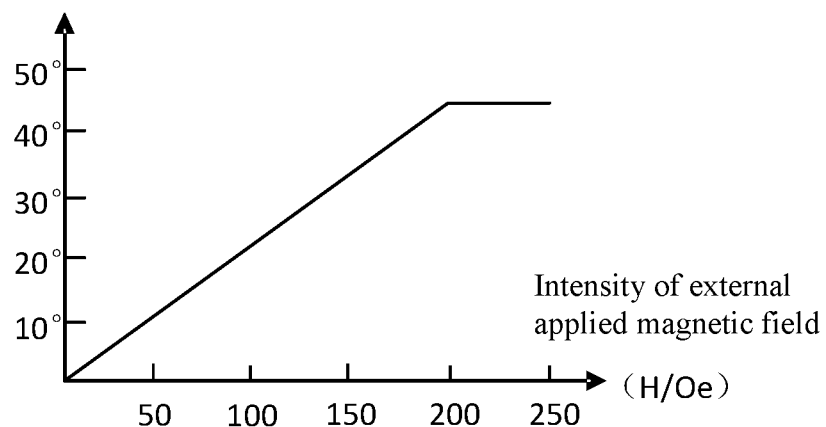
FIG. 2 is a schematic diagram of relationship between a Faraday rotation angle of a Garnet saturated magnetic field thin film and an externally applied magnetic field according to an embodiment of the present disclosure.

As an example, a magneto-optical material of the magneto-optic crystal may be a Garnet saturated magnetic field (GSF) thin film. A Faraday rotation angle is associated with a propagation distance of a light in the magneto-optic crystal material and a magnitude of an externally applied magnetic field, and to help understanding the relation, please refer to FIG. 2. FIG. 2 is a schematic diagram of relationship between a Faraday rotation angle of a GSF thin film and an externally applied magnetic field according to an embodiment of the present disclosure. It is noted that: FIG. 2 show an instance where the propagation distance of the light in the GSF thin film is set to be 470 μm as an exemplary value. As shown in FIG. 2, when the externally applied magnetic field reaches 200 Oe, a magnetic field saturation state of the GSF thin film (which is decided by a property of the GSF thin film per se) is reached, and the Faraday rotation angle of the GSF thin film can reach 45° (a saturation rotation angle); at this time, even if the magnetic field intensity is increased continuously, the Faraday rotation angle will not be increased. However, before the intensity of the applied magnetic field reaches the magnetic field saturation state of the GSF thin film, the Faraday rotation angle is linearly proportional to the intensity of applied magnetic field.

It is noted that the saturation rotation angle of 45° in FIG. 2 is based on the propagation distance (470 μm) which has been set, and not all the situations are that when the Faraday rotation angle reaches 45°, the saturation rotation angle is reached; and if the propagation distance is increased, the Faraday rotation angle is also increased (which may reach 90°), and if the propagation distance is decreased, the Faraday rotation angle is also decreased (which may be approximate to 0°).

The embodiments of the present disclosure are illustrated by using the GSF as an example; however, the embodiments of the present disclosure are not limited thereto. For example, the magneto-optic crystal in the magneto-optical switch structure may also be prepared by using other different types of magneto-optical materials.

In an embodiment of the present disclosure, for example, the coil may be a solenoid formed by winding a lead. For example, to match the coil in a solenoid shape, the magneto-optic crystal may also be made, for example, into a cylindrical shape, and the magneto-optic crystal may also be made into a rectangle, or other shapes (e.g., a trapezoid). For example, the coil may also be wound into a rectangular tube by the lead, and to match the rectangular tube, the magneto-optic crystal may be made into a rectangle; however, the embodiments of the present disclosure are not limited thereto.

As an example, since a copper wire has good conductivity, in an embodiment of the present disclosure, the lead may be a copper wire; however, the embodiments of the present disclosure are not limited thereto, for example, the lead may also be other metal leads, such as an aluminum wire, or an iron wire. In an embodiment of the present disclosure, if a copper wire is selected as the lead, the copper wire may be an enamelled copper wire, an insulated copper wire, or copper wires coated with an insulating material in other forms, and a copper wire without an insulating material may also be directly used. For the lead made of other materials, wire forms similar to those of the copper wire may also be used.

For the magneto-optical switch structure 70, an example of this embodiment provides a variety of combinations of parameters. For example, a diameter of the enamelled copper wire may be 0.01 mm to 0.02 mm. A length of the solenoid may be 4 mm to 8 mm. A diameter of the solenoid may be 0.183 mm to 0.23 mm. The number of turns of the coil may be 200 to 300. But the embodiments of the present disclosure are not limited thereto.

For example, one set of parameter values are: the diameter of the enamelled copper wire is 0.01 mm, the length of the solenoid is 4 mm, the diameter of the solenoid is 0.183 mm, and the number of turns N of the coil is 200.

Also, for example, another set of parameters are: the diameter of the enamelled copper wire is 0.02 mm, the length of the solenoid is 8 mm, the diameter of the solenoid is 0.23 mm, and the number of turns N of the coil is 300.

The described above are two examples of combination of parameters; however, the embodiments of the present disclosure are not limited thereto. For example, in an embodiment of the present disclosure, the parameters in the combination of parameters may also be subjected to a random combinatorial adjustment, so that the magnetic field generated by the magneto-optical switch structure can meet a predetermined requirement on the intensity of the magnetic field. The magneto-optical switch structure obtained after combination of different parameters may have a different volume, which may affect a thickness of the array substrate having the magneto-optical switch structure, but will not affect the rotation angle of the polarization plane of a light which passes through the array substrate.

An embodiment of the present disclosure also provides a magneto-optical switch display. As shown in FIG. 3, the magneto-optical switch display includes the described array substrate, and it further includes: a current pulse controller 50 connected with the thin film transistor T in the array substrate, and configured to input pulse current for the magneto-optical switch structure 70 in the array substrate; a first polarizer 10 provided on a light incident side of the array substrate, and configured to polarize an incident light incident on the array substrate; and a second polarizer 30 provided on a light emergent side of the array substrate, and configured to polarize an emergent light emitted from the array substrate.

During a working process of the magneto-optical switch structure 70, the coil 60 is firstly electrified by the pulse current inputted in the current pulse controller 50, to generate a magnetic field as the pulse current changes. According to input time of the pulse current and an input magnitude of the pulse current, whether the coil 60 generates a magnetic field, or not, and a magnitude of the generated magnetic field may be classified into cases as bellows.

(1) When the coil does not generate a magnetic field (i.e., when the pulse current is not inputted into the coil), the emergent light is entirely transmitted through the second polarizer, and pixels of the array substrate display a highest gray scale.

In this case, since the coil does not generate the magnetic field, the magneto-optic crystal interposed in the coil will not be magnetized, and an angle of the polarization plane of light which passes through its inside (i.e., the incident light incident on the array substrate) will not be affected. In this way, a transmission rate of the emergent light emitted from the array substrate will not be affected in any way, and the emergent light can entirely pass through the second polarizer. At this time, the pixels of the array substrate can display the highest gray scale.

(2) When the magnetic field intensity value of the magnetic field generated by the coil is smaller than a preset magnetic field intensity threshold (i.e., when the pulse current is inputted into the coil, but it is not large enough), the emergent light is partially transmitted through the second polarizer, and the pixels of the array substrate display a gray scale between the highest gray scale and a lowest gray scale.

In this case, since the coil has generated a magnetic field (whose magnetic field intensity value is smaller than the preset magnetic field intensity threshold), the magneto-optic crystal interposed in the coil will be magnetized, and the angle of the polarization plane of the light which passes through its inside (i.e., the incident light incident on the array substrate) will be affected (a changed angle is greater than 0 degree and less than 90 degrees), and the transmission rate of the emergent light emitted from the array substrate will be affected, that is, only part of light call pass through the second polarizer. At this time, the pixels of the array substrate display a gray scale between the highest gray scale and the lowest gray scale.

(3) When the magnetic field intensity value of the magnetic field generated by the coil reaches but does not exceed the preset magnetic field intensity threshold, the emergent light cannot be transmitted through the second polarizer, and the pixels of the array substrate display the lowest gray scale.

In this case, since the coil has generated a magnetic field (whose magnetic field intensity value reaches but does not exceed the preset magnetic field intensity threshold), the magneto-optic crystal interposed in the coil will be magnetized, and the angle of the polarization plane of the light which passes through its inside (i.e., the incident light incident on the array substrate) will be affected (a changed angle is 90 degrees), and the transmission rate of the emergent light emitted from the array substrate will be greatly affected, that is, no light can pass through the second polarizer. At this time, the pixels of the array substrate display the lowest gray scale.

It is noted that for the preset magnetic field intensity threshold in (2), or (3), the magnitude thereof can be set according to the parameters of the described magneto-optical switch structure, to meet a condition that when the magnetic field intensity value generated by the coil reaches the preset magnetic field intensity value, the rotation angle of the polarization plane of light which passes through the array substrate is exactly 90 degrees, and even light which passes through the array substrate cannot be emitted from the second polarizer.

In an embodiment of the present disclosure, for example, as shown in FIG. 3, the magneto-optical switch display also includes a backlight 1 disposed at the light incident side of the first polarizer 10, and configured to generate the incident light, and a color filter 40 disposed on the light emergent side of the second polarizer 30.

By using the magneto-optical switch display according to the embodiment of the present disclosure, since the magneto-optical switch structure is additionally provided in the array substrate, the intensity of light which passes through the magneto-optical switch structure can be controlled, so that the problem of slow response speed of the LCD display pixel can be solved.

Hereinafter, an embodiment of the present disclosure will be further described by an example, and at the same time, in conjunction with the drawings, and by description of this example, an implementation mode of the embodiment of the present disclosure, such as a control structure and an interconnection mode involved, is further described, so as to help deeper and accurate understanding of the conception of the technical solutions provided by the embodiments of the present disclosure and the technical solutions per se.

This example provides a display having a magneto-optical switch display structure. The display includes a backlight, a polarizer, an array substrate of a magneto-optical switch structure, and a color filter. The array substrate of the magneto-optical switch structure includes a magneto-optic crystal, a coil for generating a magnetic field, and a thin film transistor (TFT).

Figure 4A:
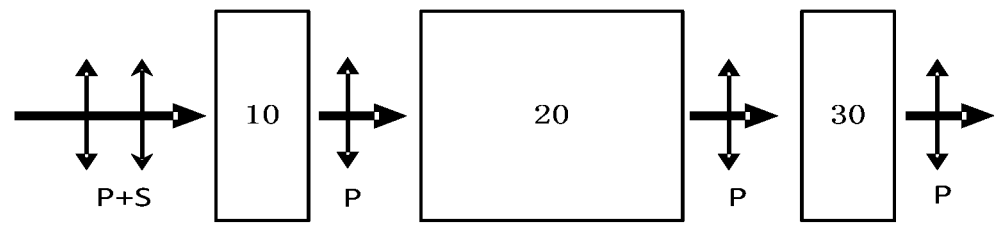
FIG. 4A is a schematic diagram when a magneto-optical switch is in turn-on (ON) state according to an embodiment of the present disclosure.
Figure 4B:
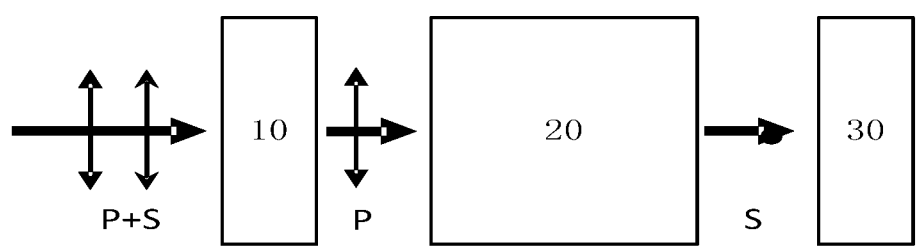
FIG. 4B is a schematic diagram when the magneto-optical switch is in turn-off (OFF) state according to an embodiment of the present disclosure.

As shown in FIG. 3, the display includes a backlight 1, a first polarizer 10, an array substrate of a magneto-optical switch structure, a second polarizer 30 and a color filter 40. The magneto-optical switch structure 70 includes a magneto-optic crystal 20, a coil 60 for generating a magnetic field, and a single pixel equivalent circuit driven by a TFT. On two sides of the array substrate of the magneto-optical switch structure, the first polarizer 10 and the second polarizer 30 are respectively placed, the backlight 1 is placed behind the first polarizer 10, and the color filter 40 is placed in front of the second polarizer 30. As shown in FIG. 4A to FIG. 4B, a working flow is as below: natural light generated by the backlight 1 passes through the first polarizer and becomes linearly polarized light, the linearly polarized light is incident into the array substrate of the magneto-optical switch structure, and emergent light which passes through the array substrate of the magneto-optical switch structure passes through the second polarizer 30 and then is displayed by the color filter 40, and an included angle between the first polarizer 10 and the second polarizer 30 is 0 degree. If there is no external magnetic field (i.e., the coil structure is not electrified with current to form a magnetic field) magnetizing the magneto-optic crystal 20, the polarization plane, when light passes through the magneto-optic crystal 20, will not be rotated, and the light can be emitted through the second polarizer 30, at this time, the magneto-optical switch is in a turn-on (ON) state (as shown in FIG. 4A), and the pixel displays the highest gray scale. If there is an external magnetic field (i.e., the coil 60 structure is electrified with current to form a magnetic field) magnetizing the magneto-optic crystal 20, the polarization plane, when the linearly polarized light passes through the magneto-optic crystal 20, will be rotated by a certain angle, and part of light can pass through the second polarizer 30, and at this time, the pixels display any gray scale between the highest gray scale and the lowest gray scale. If the external magnetic field (i.e., the coil 60 structure is electrified with current to form a magnetic field) has a magnitude large enough to magnetize the magneto-optic crystal 20, the polarization plane, when the linearly polarized light passes through the magneto-optic crystal 20, will be rotated by an angle of 90°, the emergent light cannot pass through the second polarizer 30, at this time, the magneto-optical switch structure 70 is in a turn-off "OFF" state (as shown in FIG. 4B), and the pixels display the lowest gray scale.

In this example, the backlight is placed behind the array substrate of the magneto-optical switch structure, and the backlight may be a backlight used in the LCD display, or other light source structures capable of generating uniform light.

In this example, the first polarizer 10 is placed in front of the backlight 1, so that the natural light generated by the backlight is converted into linearly polarized light. The first polarizer may be a polarizer, and may also be a polarizing beam splitting prism.

FIG. 5 is a structural schematic diagram of the magneto-optical switch structure 70 according to an embodiment of the present disclosure; and the magneto-optical switch structure 70 includes a magneto-optic crystal 20, a coil 60 structure for generating a magnetic field, and a single pixel equivalent circuit driven by a TFT. The magneto-optic crystal 20 is located inside the coil 60 structure for generating a magnetic field, a drain electrode of the TFT is connected with one end of the coil, and a source electrode and a gate electrode of the TFT are connected with the current pulse controller 50. For example, the array substrate of the magneto-optical switch structure constituted by the magneto-optical switch structure may be prepared into a magneto-optical thin film.

In this example, the second polarizer 30 is placed in front of the array substrate of the magneto-optical switch structure, and the color filter 40 is placed in front of the second polarizer 30.

In an example, in a horizontal incidence mode, for example, when the propagation distance of light in the thin film is l=4 mm (4000 μm), and when the rotation angle which needs to be reached is 90 degrees, as calculated by a formula below, it can be known that a magnitude of a needed applied magnetic field H is 47 Oe:

$$V = \frac{45°}{470 \ \mu m \cdot (200 \cdot 4\pi) Gs} = 0.381°/(\mu m \cdot Gs)$$

$$\theta = VBd$$

$$\theta = 90°, d = 4000 \ \mu m, \Rightarrow H = \frac{B}{4\pi} = \frac{\theta}{4\pi V d} = 47 \ \text{Oe}.$$

For another example, when the propagation distance of the light in the thin film is l=8 mm (8000 μm), and the rotation angle which needs to be reached is 90 degrees, as calculated by a formula below, it can be known that a magnitude of a needed applied magnetic field H is 23.5 Oe:

$$V = \frac{45°}{470 \ \mu m \cdot (200 \cdot 4\pi) Gs} = 0.381°/(\mu m \cdot Gs)$$

$$\theta = VBd$$

$$\theta = 90°, d = 8000 \ \mu m, \Rightarrow H = \frac{B}{4\pi} = \frac{\theta}{4\pi V d} = 23.5 \ \text{Oe}.$$

Figure 6:
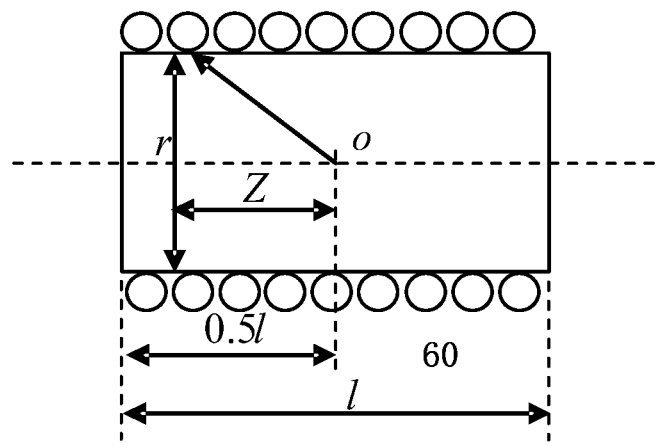
FIG. 6 is a schematic diagram of a model of a coil according to an embodiment of the present disclosure.

FIG. 6 is a schematic diagram of a model of a coil according to an embodiment of the present disclosure, wherein a coil model of the magneto-optical switch in the example is shown, and an intensity of the generated magnetic field can be calculated by a formula below:

$$B_{Z0} = \frac{1}{2}\mu_0 \frac{N}{l} I \left[ \frac{\frac{1}{2}l + z}{\sqrt{r^2 + \left(\frac{1}{2}l + z\right)^2}} + \frac{\frac{1}{2}l - z}{\sqrt{r^2 + \left(\frac{1}{2}l - z\right)^2}} \right]$$

Where l is a length of the solenoid, r is a diameter of the solenoid, Z is a distance from any point on a central axis of the solenoid to the center, N is the number of turns of the coil, and I is a magnitude of current passing through the solenoid. For example, when the solenoid has a length of l=4 mm, a diameter of r=0.183 mm, and is prepared by winding an enameled copper wire with a diameter of 0.01 mm, with the number of turns of N=200, I=0.5 A, an average magnetic field intensity within the solenoid is calculated to be 47 Oe.

The magnetic field intensity 23.5 Oe may also be calculated by using the described formula under a corresponding condition, which will not be repeated here.

In an example, the current pulse controller controls a magnitude of current of the respective magneto-optical switches, to implement that the polarization plane can be randomly rotated within 0 degree to 90 degrees when the linearly polarized light passes through the magneto-optic crystal, so as to control display gray scales of respective pixels, and match the color filter to finally form a color image.

In the embodiments of the present disclosure, it is proposed to additionally provide a magneto-optical switch, which is a display structure, in the array substrate. That is, the magneto-optical switch structure is used for replacing the liquid crystal optical switch structure in the LCD display. Based on the magneto-optical Faraday effect, the rotation angle of the polarization plane is changed when polarized light propagates in the medium by electromagnetic intensity of the magnetic field, and the "on" and "off" states of an optical path is selected by using the second polarizer, which can control the intensity and the transmission rate of light which passes through the magneto-optical switch structure. In this way, the display response speed of the display can be effectively improved, so as to achieve an effect of improving the user experience.

The described above are only exemplary embodiments of the present disclosure. For one of ordinary skill in the art, various changes and alternations may be made without departing from the principle of the present disclosure, and all of these changes and alternations shall fall within the scope of the present disclosure.

The present application claims priority to the Chinese Patent Application No. 201610003747.1 filed on Jan. 4, 2016 entitled 'ARRAY SUBSTRATE AND MAGNETO-OPTICAL SWITCH DISPLAY,' which is incorporated herein in its entirety by reference.

What is claimed is:

1. A magneto-optical switch display, comprising,
an array substrate, wherein the array substrate comprises:
   a thin film transistor; and
   a magneto-optical switch structure, the magneto-optical switch structure including a coil connected with the thin film transistor, and a magneto-optic crystal interposed in the coil, the magneto-optical switch structure being configured to change a transmission rate of emergent light which passes through the array substrate;
a current pulse controller connected with the thin film transistor in the array substrate, and configured to input pulse current for the magneto-optical switch structure in the array substrate;
a first polarizer provided on a light incident side of the array substrate, and configured to polarize the incident light incident on the array substrate; and
a second polarizer provided on a light emergent side of the array substrate, and configured to polarize the emergent light transmitted from the array substrate.

2. The magneto-optical switch display according to claim 1, wherein when the coil does not generate a magnetic field, the emergent light is entirely transmitted through the second polarizer, and pixels of the array substrate display a highest gray scale.

3. The magneto-optical switch display according to claim 1, wherein when a magnetic field intensity value of the magnetic field generated by the coil is smaller than a preset magnetic field intensity threshold, the emergent light is partially transmitted through the second polarizer, and the pixels of the array substrate display a gray scale between the highest gray scale and a lowest gray scale.

4. The magneto-optical switch display according to claim 1, wherein when a magnetic field intensity value of the magnetic field generated by the coil reaches but does not exceed a preset magnetic field intensity threshold, the emergent light cannot transmit through the second polarizer, and the pixels of the array substrate display a lowest gray scale.

5. The magneto-optical switch display according to claim 1, further comprising:
   a backlight provided at the light incident side of the first polarizer, and configured to generate the incident light; and a color filter provided on the light emergent side of the second polarizer.

6. The magneto-optical switch display according to claim 1, wherein the coil includes a solenoid formed by winding a lead.

7. The magneto-optical switch display according to claim 6, wherein the solenoid has a length in a range of 4 mm to 8 mm, the solenoid has a diameter in a range of 0.183 mm to 0.23 mm, and the number of turns of the coil is 200 to 300.

8. The magneto-optical switch display according to claim 2, further comprising:
   a backlight provided at the light incident side of the first polarizer, and configured to generate the incident light; and a color filter provided on the light emergent side of the second polarizer.

9. The magneto-optical switch display according to claim 2, further comprising:
   a backlight provided at the light incident side of the first polarizer, and configured to generate the incident light; and a color filter provided on the light emergent side of the second polarizer.

10. The magneto-optical switch display according to claim 3, further comprising:
    a backlight provided at the light incident side of the first polarizer, and configured to generate the incident light; and a color filter provided on the light emergent side of the second polarizer.

11. The magneto-optical switch display according to claim 1, wherein a single pixel equivalent circuit is driven by the TFT.

12. The magneto-optical switch display according to claim 1, wherein a magneto-optical material of the magneto-optic crystal includes a Garnet saturated magnetic field thin film.

13. The magneto-optical switch display according to claim 1, wherein the TFT includes a drain electrode, a source electrode and a gate electrode, the drain electrode of the TFT being directly connected with one end of the coil, and the source electrode and the gate electrode of the TFT being connected with a current pulse controller.

14. The magneto-optical switch display according to claim 6, wherein the lead includes a metal lead.

15. The magneto-optical switch display according to claim 14, wherein the metal lead includes an enamelled copper wire, or an insulated copper wire.

16. The magneto-optical switch display according to claim 15, wherein the enamelled copper wire has a diameter in a range of 0.01 mm to 0.02 mm.

* * * * *